Nov. 17, 1942.                J. H. RICHARDS                2,302,506
              DUPLICATING ATTACHMENT FOR MILLING MACHINES
                         Filed March 11, 1941
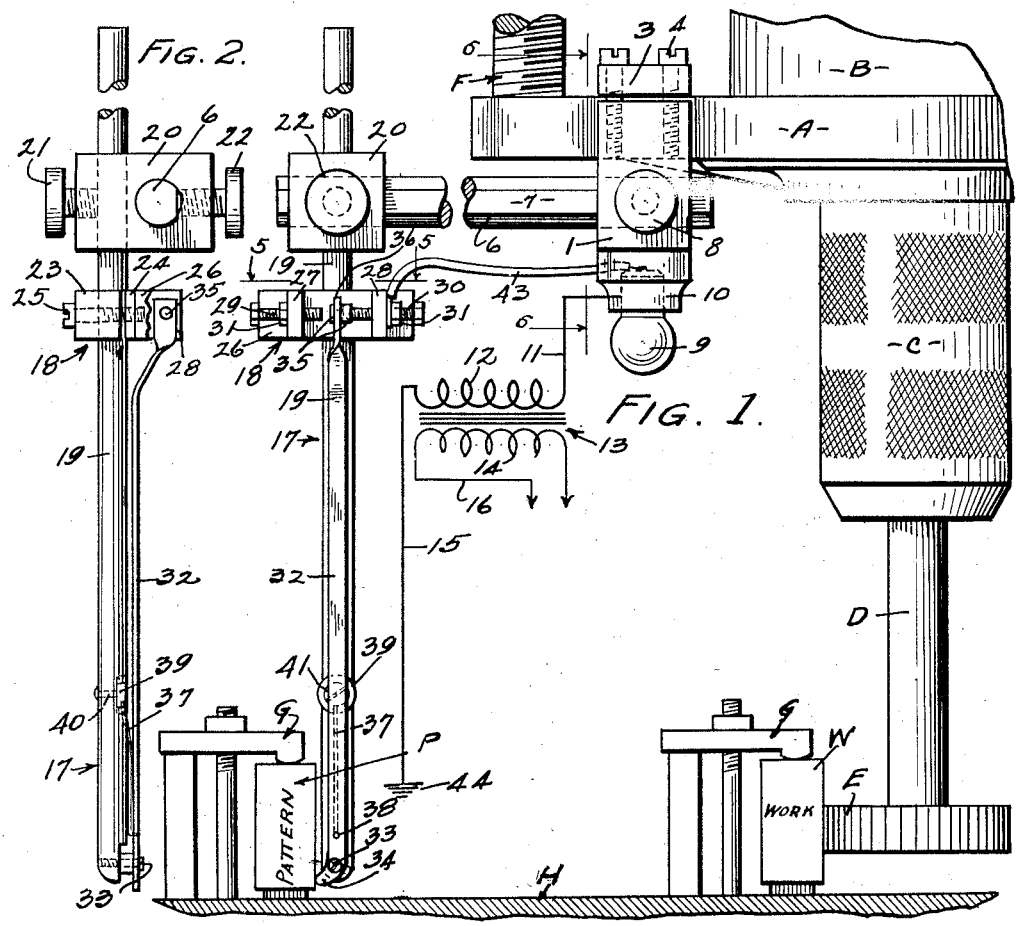
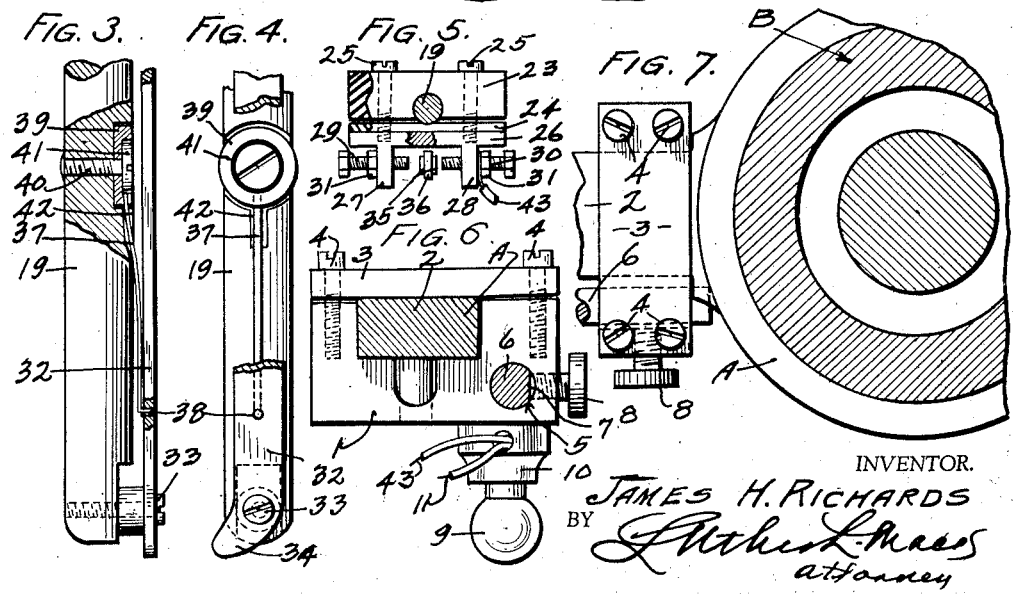
INVENTOR.
JAMES H. RICHARDS
BY
attorney Patented Nov. 17, 1942

2,302,506

UNITED STATES PATENT OFFICE 2,302,506

DUPLICATING ATTACHMENT FOR MILLING MACHINES

James H. Richards, Glendale, Calif.

Application March 11, 1941, Serial No. 382,722

3 Claims. (Cl. 90—62)

This invention relates to duplicating attachments for milling machines and the principal object is to provide a simple, economical and efficient attachment adapted for application to any conventional milling machine and embodying a tracer element arranged for traversing the surfaces of a work pattern which is to be duplicated and so mounted with respect to the milling tool and stem that when the tool cuts on a work blank to the depth of the surface of the pattern a signal will be afforded the operator, thereby requiring substantially less time of the operator in making frequent observations and measurements to ascertain the depth or extent to which the tool has previously cut.

My present improvements are particularly adaptable to milling attachments of my inventions as disclosed in my pending application for patent for All angle milling attachments, filed February 16, 1940, Serial Number 319,290, in which the cutting tool is universally adjustable relative to the work at any desired angle and in any desired plane, and though the invention is not limited for use to my particular apparatus, I will describe herein its application to such apparatus for illustrating the use and operation of the device.

An object, also, is to provide a duplicating attachment of but few parts and is preferably electrical in character and so mounted on the quill of a milling tool support, with adequate adjustments, that when a pattern and a work blank are similarly mounted upon a bed or work table of a milling machine the tracer and tool will contact the pattern and work blank, respectively, the tracer and tool being in substantial parallelism during a duplicating operation.

The invention comprehends, therefore, the provision of an electric signal, such as a low voltage electric lamp arranged for connection with a source of current and where necessary for connection with a transformer in the circuit for reducing the voltage from standard service voltage as when connected with electric supply systems, and a pair of contacts which are spaced apart and between which a contact which is movable with the tracer is disposed, normally engaged with one of said contacts but capable of being swung into contact with the other contact for first indicating to an operator when the required depth of a cut is attained and thereafter the fact that the cut has been made too deep.

A further object is to provide means for adjustment of the different parts of the apparatus so as to meet practically all demands of use in connection with milling machines. Still other objects may appear as the description progresses.

I have shown a preferred form of my invention in the annexed drawing, subject to modification, within the scope of the appended claims, without departing from the spirit of the invention.

In said drawing:

Fig. 1 is a front elevation of a milling apparatus showing my improvements arranged in operative connection therewith;

Fig. 2 is a side elevation of the tracer unit;

Fig. 3 is an enlarged fragmentary elevation of the lower end of the tracer arm and associated elements;

Fig. 4 is an elevation of the same at right angles to Fig. 3;

Fig. 5 is a plan view of the tracer unit as seen from line 5—5 of Fig. 1;

Fig. 6 is an elevational view on line 6—6 of Fig. 1; and

Fig. 7 is a top plan view of the apparatus shown in Fig. 1.

Now, referring to the drawing, it will be observed that the apparatus is mounted upon a bracket A to which is attached a quill housing B and from which is operatively suspended a clutch C for holding a tool stem D on the lower end of which is a cutting tool E, all as shown in Fig. 1. The housing B encloses a tool spindle (not shown) which is usually adapted for extension from the housing as determined by a depth gauge F, all of which elements are not directly parts of the present invention but are employed as a mounting for my duplicating means and are essential in connection therewith. The duplicating means includes a support comprising a block 1 formed so as to wholly or partially embrace a portion 2 of the bracket A and attached thereto as by means of a clamp including a plate 3 held in position as by means of screws 4. Block 1 is bored at 5 to receive an elongated rod 6 which preferably has a flat 7 adapted to be engaged by the inner end of a set screw 8 so as to prevent the turning of the rod in its supporting block 1 but permitting the longitudinal adjustment of the rod and the elements carried thereby, as hereinafter described.

I provide on the bottom of block 1 an electric lamp 9 held in a socket 10 attached to said block and connected as by means of a wire 11 from one of its terminals with one side 12 of a transformer 13, the coil 12 of said transformer and its other coil 14 being connected, respectively, with a source of current by means of wires 15 and 16. The other terminal of said lamp is connected with certain contact devices as hereinafter described.

Rod 6 serves as an adjustable support for a tracer unit generally represented at 17 and a contact device 18 and includes a vertically disposed rod 19 adjustable in a block 20 and adapted to be held in adjusted position by means of a set screw 21. Block 20 also slidably receives the rod 6 and carries a set screw 22 engageable with the flat 7 on rod 6 for holding the tracer unit stationary on said rod 6 in adjusted positions for use.

Slightly below block 20 I provide the contact device 18 which includes a block 23 formed of insulating material and embracing and adapted to be clamped on rod 19 by means of an insulated clamping plate 24 and screws 25 extended through said block 23 and said plate 24 as well as into a metallic bracket 26, as shown in Fig. 5, for instance. Bracket 26 has a pair of outwardly extended lugs 27 and 28 which support adjustable contact screws 29 and 30, respectively, and may be locked in adjusted position as by means of lock nuts 31 so that the inner adjacent ends of the contact screws will be properly spaced apart.

Tracer unit 17 includes an elongated lever 32 which is insulated from rod 19 and pivotally supported at 33 on the lower flattened end of rod 19. The lever 32 has a slightly curved stylus portion 34 adapted to engage and move over the surface of a surface of the work pattern P, as shown in Fig. 1. The upper extremity of lever 32 is bent at right angles to its body so as to provide a portion 36 for holding contacts 35, 35 thereon opposite and adapted for engagement with the adjacent ends of contact screws 29 and 30. Lever 32 is tensioned by means of a hair spring 37 having its lower end 38 held in a hole in the lever and its upper end secured in an insulating disc 39 which is countersunk in the front portion of lever 32, as shown in Fig. 2 and is held as by means of a screw 40 extended through rod 19 and riveted at its rear side over the surface of said rod while the head 41 is preferably countersunk in disc 39 and serves the double purpose of holding the disc in set position and the upper end of the wire 37 in the countersunk portion of the disc. To such end the rod 19 may be grooved at 42 and the disc correspondingly grooved or perforated so that the end of the wire 37 may be firmly held in position for tensioning the lever in one or both directions.

The lever 32 is thus insulated from the rod 19 and set so that under normal conditions one of the contacts 35 thereon will be engaged with the contact screw 30, as shown in Fig. 1, and disengaged from screw 29 as at the beginning of a milling operation, the opposite terminal of lamp 9 from wire 11 is connected with one of the contacts as at 30 by means of a wire 43. Wire 15 leading from the transformer may be grounded at 44. When the stylus 34 contacts the pattern and contacts 35 engage either of the terminals 29 or 30 the lamp 9 will be energized and serve to afford a signal to the operator of the milling machine of one of two conditions, either the desired depth of a cut has been effected by the tool E or the cut has been made too deep.

The tracer unit and signal are mounted for bodily adjustment on and with the milling tool E and its quill and rod 19 and tool stem D are always parallel. The rod 19 is independently adjustable on block 20 as to its elevation to correspond to the elevation of tool E and the tracer unit is longitudinally adjustable relative to said tool for varying the distance between the tool and tracer to accommodate the instrument to work of varying size and form. The pattern P and work blank W may be similarly mounted on the bed H of a milling machine, as shown in Fig. 1, or otherwise supported, but usually clamping devices G are employed for such purpose. The pattern and work blank are of course mounted in substantially corresponding positions, end for end and side for side so that as the tool progresses over the surfaces of the work blank the tracer stylus 34 will correspondingly move over the surfaces of the pattern and to corresponding depths. The tracer is of course spaced from the surface of the pattern at the institution of a milling operation while the tool E engages the surface of the work blank. The instrument is designed for accuracy within one one-thousandth of an inch, more or less as occasion requires, and the stylus 34 being but a small fraction of the length of the contact portion of the tracer, the leverage is such that the movement of the contacts 35 for a sufficient distance to make or break contact with the terminals 29 and 30 will but slightly move the stylus correspondingly.

Spring 37 is mounted and tensioned so as to hold the lever 32 so that the contact 35 thereon will contact normally with terminal 30 and thus light the lamp 9 by closing its circuit when the circuit is completed through stylus 34, pattern P and bed H. Thus, when the stylus first engages the surface of the pattern, a signal will be made to the operator by the lighting of lamp 9 that the cut has been completed to the required depth to correspond to the pattern. Whereupon the tool is removed from engagement with the work and the lamp will be deenergized. Any resumption of a milling operation on the same surface of the work will again light the lamp by disengaging contact 35 from terminal 30 (as shown) and engaging the same with terminal 29 as a warning to the operator that the particular cut has been made too deep.

Lamp 9 is normally deenergized because the circuit thereof must be completed through stylus 34, pattern P and bed H when said stylus first engages the pattern. An overcut is indicated by opening the circuit and thereafter closing it when contact 35 disengages terminal 30 and engages terminal 29.

What I claim is:

1. A tracing unit comprising a support, a lever carried by said support provided with a stylus adapted to engage a pattern, terminals disposed on opposite sides of said lever adapted to engage contacts on the lever, means for normally holding one of the contacts on said lever in engagement with one of said terminals, and an electric signal device, said stylus and said pattern serving as a circuit closing means whereby said device is energized when said stylus contacts the pattern, said signal device being deenergized by disengagement of said one contact from said terminal upon movement of said support relative to said pattern and energized by engagement of the other contact on said lever with the other terminal upon further movement of said support relative to said pattern.

2. A tracing unit comprising a support, a lever pivotally carried by said support and provided with a stylus at one end adapted to engage a pattern, a terminal adapted to engage a contact on said lever, means for normally holding the contact on said lever in engagement with said terminal, and an electric signal device, the circuit for supplying energy to said device being completed by contact of said stylus with the pattern and opened by disengagement of the contact on said lever from said terminal upon movement of said support relative to the pattern.

3. A tracing unit comprising a support, a lever pivotally carried by said support and provided with a stylus at one end adapted to engage a pattern, a pair of terminals disposed on opposite sides of said lever adapted to engage contacts on said lever, means for normally holding one of the contacts on said lever in engagement with one of said terminals, and an electric signal device, the circuit for supplying energy to said device completed by engagement of said stylus with the pattern, said circuit being opened by disengagement of said one contact from the terminal upon movement of said support relative to the pattern and closed by engagement of another contact on said lever with the other of said terminals upon further movement of said support relative to said pattern.

JAMES H. RICHARDS.